United States Patent
Sun et al.

(10) Patent No.: US 6,782,052 B2
(45) Date of Patent: Aug. 24, 2004

(54) REFERENCE FRAME PREDICTION AND BLOCK MODE PREDICTION FOR FAST MOTION SEARCHING IN ADVANCED VIDEO CODING

(75) Inventors: Shijun Sun, Vancouver, WA (US); Louis Kerofsky, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 622 days.

(21) Appl. No.: 09/810,349

(22) Filed: Mar. 16, 2001

(65) Prior Publication Data

US 2002/0131498 A1 Sep. 19, 2002

(51) Int. Cl.[7] .................................................. H04N 7/12
(52) U.S. Cl. .................................................. 375/240.12
(58) Field of Search ...................... 375/240.01, 240.12, 375/240.24, 240.26; H04N 7/12

(56) References Cited

U.S. PATENT DOCUMENTS

| 5,712,799 | A | 1/1998 | Farmwald et al. |
| 5,754,237 | A | 5/1998 | Jung |
| 6,014,181 | A | 1/2000 | Sun |
| 6,084,908 | A | 7/2000 | Chiang et al. |
| 6,104,439 | A | 8/2000 | Jeong et al. |
| 6,130,912 | A | 10/2000 | Chang et al. |
| 6,137,837 | A | 10/2000 | Nemiroff et al. |
| 6,148,027 | A | 11/2000 | Song et al. |

Primary Examiner—Young Lee
(74) Attorney, Agent, or Firm—David C. Ripma; Matthew D. Rabdau

(57) ABSTRACT

A method provides a fast motion search in advanced video signal coding systems based on a reference-frame prediction and a block-mode prediction so that a motion search of each block mode and each reference frame is not required. A reference frame prediction $f_p$, spaced from the current frame by "p" number of frames, is determined by: $p=\min(n-1, p_0+\max(a,b,c,d))$; wherein $p_0$ is a pre-chosen positive integer, n is the total number of reference frames, wherein A, B, C, and D are image blocks adjacent to a searched block, and wherein the reference image blocks have been chosen from reference frames $f_a$, $f_b$, $f_c$ and $f_d$. The search is conducted within frames $f_0$ to $f_p$, which is a subset of all the n reference frames, so that the total computational burden is significantly decreased with respect to prior art searches. The mode frequency prediction is based on the frequencies of the block modes: $F^0 = \alpha \cdot \min(F_{mA}, F_{mB}, F_{mC}, F_{mD})$; wherein $\alpha$ is a positive parameter less than 1.0. The block-mode selection is then conducted using the mode-frequency prediction. Each mode m among all the M possible modes will be considered if $F_m$ is greater than or equal to $F^0$. If $F_m$ is less than $F^0$ then mode m will be skipped during the motion search.

22 Claims, 4 Drawing Sheets

REFERENCE FRAME PREDICTION AND BLOCK MODE PREDICTION FOR FAST MOTION SEARCHING IN ADVANCED VIDEO CODING

FIELD OF THE INVENTION

This invention relates to a method of conducting fast motion searching in advanced video signal coding systems and, more particularly, to methods of searching using a subset of multiple reference frames and/or a subset of multiple image block modes.

BACKGROUND OF THE INVENTION

A video information format provides visual information suitable to activate a television screen, or be stored on a video tape. Generally, video data is organized in a hierarchical order. A video sequence is divided into groups of frames, and each group can be composed of a series of single frames. Each frame is roughly equivalent to a still picture, with the still pictures being updated often enough to simulate a presentation of continuous motion. A frame is further divided into macroblocks. In H.26P and MPEG-X standards (Moving Picture Experts Group), a macroblock is made up of 16×16 pixels, depending on the video format. A macroblock always has an integer number of blocks, such as an 8×8 pixel coding unit.

Video compression is a critical component for any application which requires transmission or storage of video data. Compression techniques compensate for motion by reusing stored information in previous frames. This technique is referred to as temporal redundancy. Compression also occurs by transforming data in the spatial domain to the frequency domain.

Motion compensation is a fundamental technique used in video compression such as defined by the Moving Picture Experts Group (MPEG) and International Telecommunications Union (ITU) standards. Motion estimation is perhaps the most demanding task of a video encoder. Many algorithms and techniques have been proposed in the past for conducting fast motion searches. However, these methods apply various fast search strategies for certain single block modes, e.g., such as an 8×8 block mode, within only one single reference frame. None of the prior art methods known to Applicant have considered conducting a fast search with multiple reference frames and multiple image block modes, which is becoming one of the latest techniques in video coding. For example, in the ongoing ITU-T H.26L video-coding standard, up to seven block modes are considered. Moreover, there is no theoretical limit on the number of reference frames that may be considered during a motion search. These latest techniques improve video coding efficiency by providing better motion compensation. However, these techniques also increase the computational burden significantly, especially for the motion search.

In particular, traditional fast motion search techniques use a single reference frame and coding mode. The reference frame that is used and the coding mode are each specified before the search is conducted. Direct application of this method to a search of multiple reference frames and multiple modes, multiplies the complexity of the search by the number of reference frames and modes. For example, a motion search with seven block modes and five reference frames, which is a typical configuration in H.26L, requires thirty-five traditional motion searches. Even if fast search algorithms are employed for each of the frame searches, the complexity is multiplied by thirty-five.

SUMMARY OF THE INVENTION

The method of the present invention simplifies the motion search by reducing the number of frames and modes searched without a significant loss in coding performance. The invention provides a fast motion search method based on a reference-frame prediction and a block-mode prediction so that the motion search of each image block is not required to search all of the reference frames and all of the block modes. In particular, a reference frame prediction $f_p$, spaced from the current frame by "p" number of frames, can be determined by:

$$p = \min(n-1, p_0 + \max(a, b, c, d));$$

wherein $p_0$ is a pre-chosen positive integer (i.e., an addition factor), n is the total number of reference frames, wherein A, B, C and D are image blocks adjacent to searched block E, and wherein the reference image blocks for image blocks A, B, C and D have been chosen from reference frames $f_a$, $f_b$, $f_c$ and $f_d$. The search is conducted within frames $f_0$ to $f_p$, which is a subset of all the n reference frames, so that the total computational burden is significantly decreased with respect to prior art searches.

For an image block being coded, such as block E, the block mode selection can be based on the block modes in the neighboring blocks, A, B, C and D, which have been coded in the modes of mA, mB, mC and mD. The frequency of each image block mode $F_m$ is the number of times the block mode m is used for all the blocks in the previous w frames and for the blocks in the current frame that have been coded. The mode frequency prediction is then made based on the frequencies of the block modes:

$$F^0 = \alpha \cdot \min(F_{mA}, F_{mB}, F_{mC}, F_{mD});$$

wherein $\alpha$ is a positive parameter less than 1.0 (i.e., a multiplication factor). The blockmode selection can then be conducted using the mode-frequency prediction. Each mode m among all the M possible modes will be considered if $F_m$ is greater than or equal to $F^0$. If $F_m$ is less than $F^0$ then that particular mode m will be skipped during the motion search.

In particular, the invention comprises: in a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of: selecting an image block in the current frame; selecting a number of reference frames; selecting a number of blocks adjacent to said image block in the current frame; selecting a value for an addition factor; for each of said selected blocks adjacent to said image block in the current frame, determining a reference image block in one of said number of reference frames; calculating a subset of frames of said number of reference frames in which to search for said optimal reference block, wherein said subset of frames comprises multiple frames positioned rearwardly in time from said current frame, wherein the calculation comprises choosing the minimum of either the number of reference frames minus one, or the addition factor plus the maximum of the number of frames counted rearwardly in time from said current frame to reach the frame containing the reference image block in said one of said number of reference frames for each of said reference image blocks; and searching the subset of frames for said optimal reference block.

The invention further comprises in a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of: selecting an image block in the current frame; selecting a number of reference frames; selecting a number of blocks adjacent to said image block in the current frame; selecting a number of image block modes; determining the mode of each of said selected number of blocks adjacent to said image block in the current frame; determining the frequency of each image block mode within said number of reference frames; selecting a multiplication factor; calculating a mode-frequency prediction factor by multiplying the multiplication factor by the minimum one of the frequency of each image block mode; calculating a subset of modes of said number of image block modes in which to search for said optimal reference block, wherein said subset of modes comprises each of the modes of said number of image block modes when the frequency of each of said modes of said number of image block modes is greater than or equal to said mode-frequency prediction factor, and wherein said subset of modes excludes a particular mode of said number of image block modes when the frequency of the particular mode is less than said mode-frequency prediction factor; and searching the subset of modes of said number of image block modes for said optimal reference block.

The invention also comprises in a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of: selecting an image block in the current frame; selecting a number of reference frames; selecting a number of blocks adjacent to said image block in the current frame; selecting a value for an addition factor; for each of said selected blocks adjacent to said image block in the current frame, determining a reference image block in one of said number of reference frames; calculating a subset of frames of said number of reference frames in which to search for said optimal reference block, wherein said subset of frames comprises multiple frames positioned rearwardly in time from said current frame, wherein the calculation comprises choosing the minimum of either the number of reference frames minus one, or the addition factor plus the maximum of the number of frames counted rearwardly in time from said current frame to reach the frame containing the reference image block in said one of said number of reference frames for each of said reference image blocks; selecting a number of image block modes; determining the mode of each of said selected number of blocks adjacent to said image block in the current frame; determining the frequency of each image block mode; selecting a multiplication factor; calculating a mode-frequency prediction factor by multiplying the multiplication factor by the minimum one of the frequency of each image block mode; calculating a subset of modes of said number of image block modes in which to search for said optimal reference block, wherein said subset of modes comprises each of the modes of said number of image block modes when the frequency of each of said modes of said number of image block modes is greater than or equal to said mode-frequency prediction factor, and wherein said subset of modes excludes a particular mode of said number of image block modes when the frequency of the particular mode is less than said mode-frequency prediction factor; and searching the subset of frames of said number of reference frames and searching the subset of modes of said number of image block modes for said optimal reference block.

Accordingly, an object of the invention is to provide a method of conducting a fast motion search in advanced video coding.

Another object of the invention is to provide a method of conducting reference frame prediction and/or block mode prediction in a fast motion search.

A further object of the invention is to provide a method of conducting a search including a subset of multiple reference frames and/or a subset of multiple image block modes.

DETAILED DESCRIPTION OF THE PREFERRED EMBODIMENTS

Figure 1:
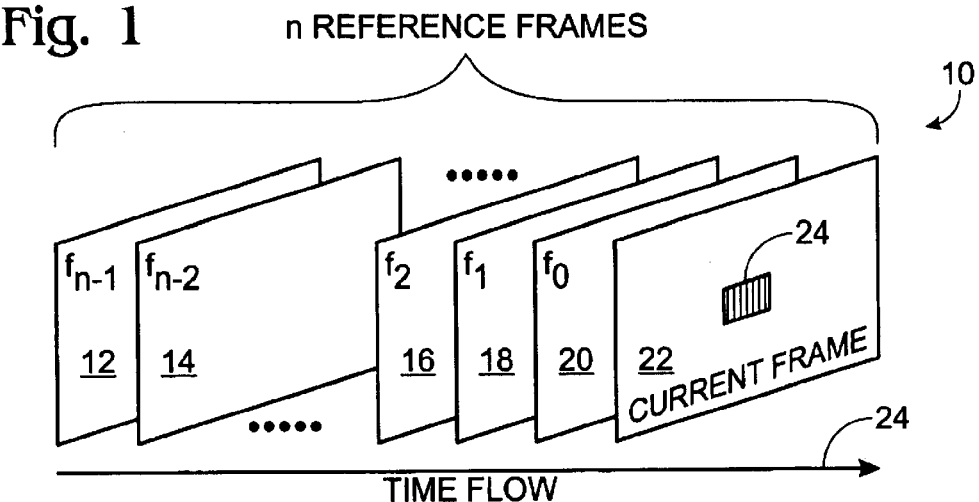
FIG. 1 is a schematic of multiple reference frames utilized during a motion search.

Turning now to the drawings, FIG. 1 shows a schematic diagram 10 of multiple reference frames 12, 14, 16, 18, 20, and 22. The frames are arranged along a horizontal axis 24 representing the flow of time, with frame 22 being the current frame and frame 12 being the frame furthest in the past. i.e., most rearwardly in time from frame 22. When integer n (with n>1) reference frames are used in the motion search for an image block 24 within current frame 22, the probability of selecting the optimal reference block from a reference frame temporally close to the current frame, for example frame 20, labeled as frame $f_0$, is much higher than the probability of choosing the reference block from a reference frame far away from the current frame such as frame 12, labeled as frame $f_{n-1}$. Therefore, while consuming a great deal of computational time, a search through all of the n reference frames for all the image blocks in the current frame 22 will not give a significant benefit. To take advantage of this understanding, a reference-frame prediction technique has been developed.

Figure 2:
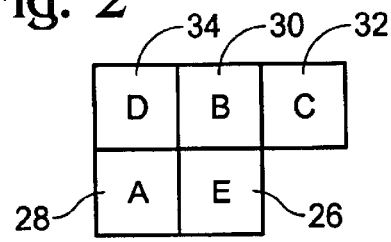
FIG. 2 is a schematic of an image block in a current image frame and its adjacent image blocks.

FIG. 2 shows several blocks within a single frame. Block 26, labeled E, represents an image block in the current image frame for which a motion search will be conducted. Blocks 28, 30, 32 and 34, labeled A, B, C and D, respectively, are the possible image blocks adjacent to block 26, i.e., block E, in the current frame whose reference image blocks have been chosen from reference frames $f_a$, $f_b$, $f_c$ and $f_d$, respectively, wherein $f_a$ is the reference frame within the sequence of n frames containing the reference image block for block A. A prediction frame, $f_p$, can be derived wherein p is the number of frames from the current frame, with p defined as the following:

$$p=\min(n-1, p_0+\max(a,b,c,d));\qquad\text{Equation 1}$$

where $p_0$ is a pre-chosen positive integer parameter, i.e., the addition factor. The motion search for image block 26, i.e., image block E, can be conducted within frames $f_0$ to $f_p$, which is a subset of all of the n reference frames, so that the total computational burden is significantly decreased. The addition factor $p_0$ can be changed or adjusted during the video coding process to control the motion search and the video quality, i.e., $p_0$ can be changed dynamically during the coding process.

The prediction of $f_p$ can be very flexible. In particular, the prediction can be made from various sets of the neighboring image blocks. For example, the following equations will give very similar results:

$$p=\min(n-1, p_0+\max(a,b,c));\text{or}\qquad\text{Equation 2}$$

$$p=\min(n-1, p_0+\max(a,b)).\qquad\text{Equation 3}$$

In a special case, where all the neighboring blocks used for prediction are out of the image frame or are coded as intra blocks, the value of p will be set to (n−1), which means all of the reference frames will be considered during the motion search. Accordingly, as a worst case scenario, in particular search scenarios, the method of the present invention will require the same number of computations as the prior art full searches. However, as stated above, the method of the present invention, due to the frame prediction computation, typically will comprise a search of only a subset of the full number of frames, thereby reducing the computational burden of the search when compared to prior art search methods.

Figure 3:
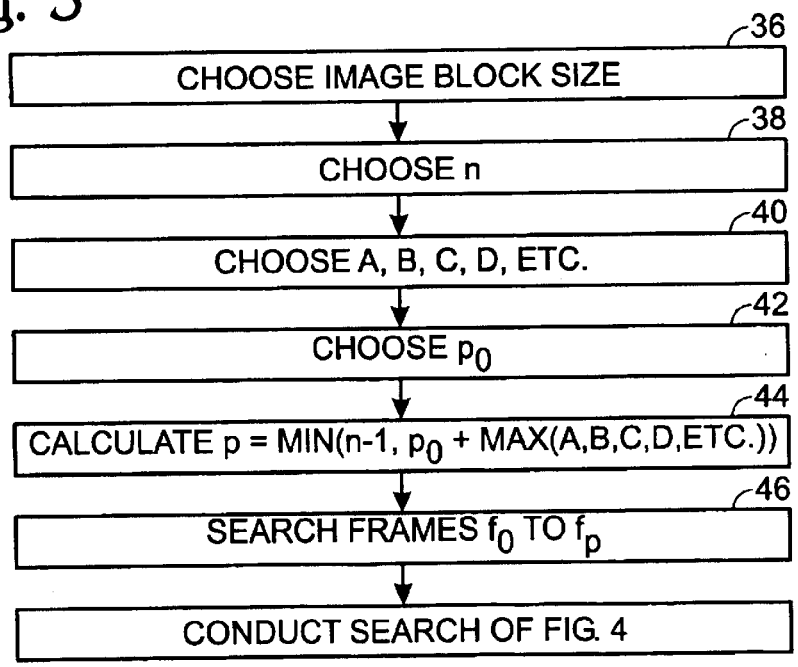
FIG. 3 is a flowchart of the method of reference frame prediction.
Figure 4:
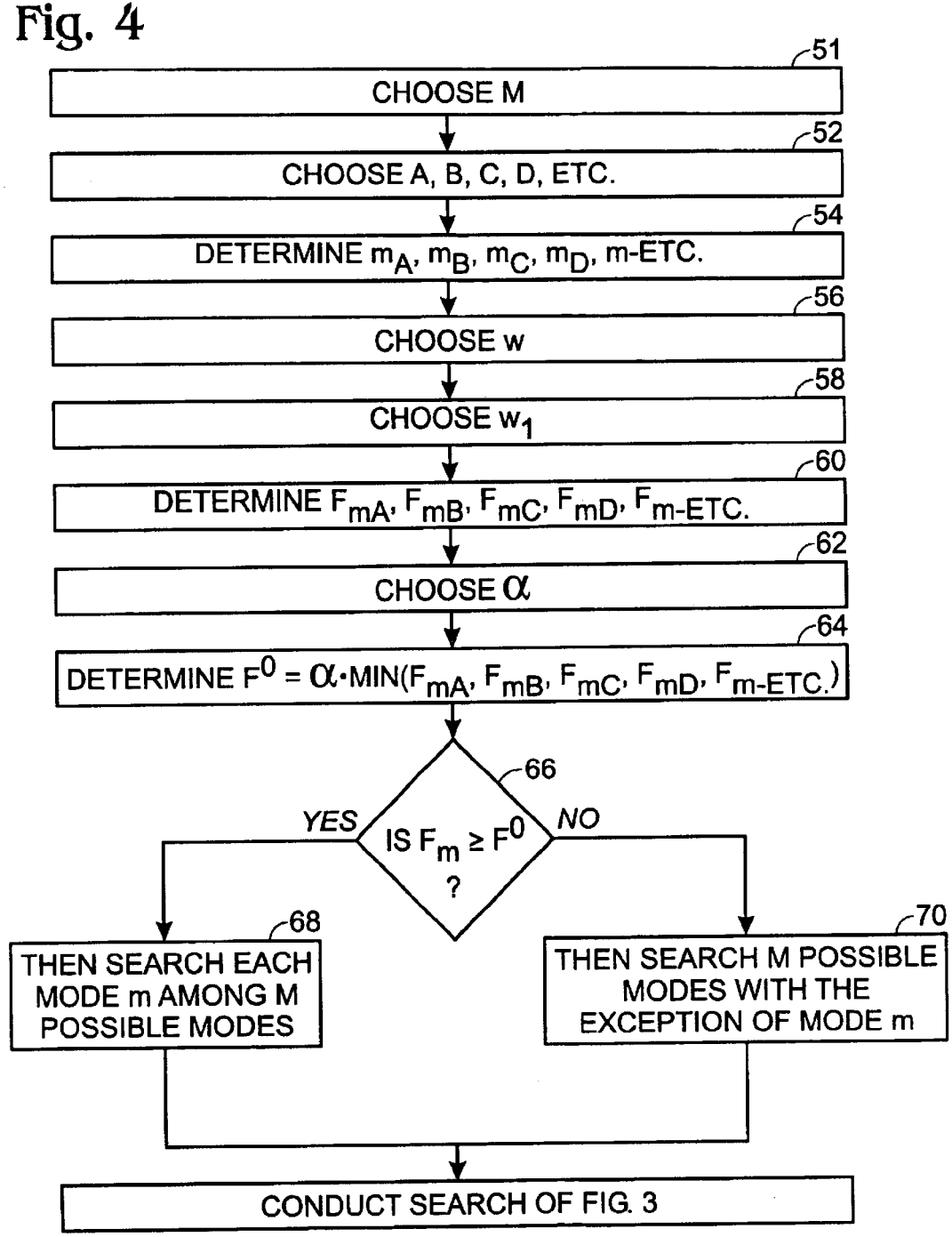
FIG. 4 is a flowchart of the method of block mode prediction.

FIG. 3 shows a flowchart of the method of reference frame prediction. In particular, step 36 comprises choosing the image block size, such as a size of 16×16. Step 38 comprises choosing n, the number of reference frames. Step 40 comprises choosing the possible image blocks adjacent to the block to be searched, such as choosing blocks A and B, choosing blocks A, B and C, choosing blocks A, B, C and D, choosing blocks A, B, C, D and F, etc. Step 42 comprises choosing $p_0$, the predetermined positive integer. Step 44 comprises calculating p by Equations 1, 2, 3 or other similar equation for the chosen number of blocks adjacent to the block to be searched (determined in step 40). Step 46 comprises searching frames $f_0$ to $f_p$, wherein p is determined in step 44. Those skilled in the art will understand that the individual steps shown in FIG. 3 may be conducted in a variety of different sequences, i.e., the initially chosen variables may be chosen in any order. Moreover, the search may be conducted before, after or simultaneous to a block mode prediction search as shown in FIG. 4.

Similar to the observations discussed above with respect to multiple reference frames, Applicant has observed that when there are M possible image block modes, the determination of the mode for each image block during the motion search is also very costly if each of the M modes are tested. However, it has been found in experiments conducted by Applicant that most of the image blocks are actually coded using only a subset of the M modes. The subset of the modes may vary depending on the specific video content and coding parameters. To make better use of this understanding, a block-mode prediction method has been developed.

For an image block being coded, such as block 26 in FIG. 2, i.e., block E, the block mode selection can be based on the block modes of the neighboring blocks 28, 30, 32 and 34, i.e., blocks A, B, C and D, respectively, which have been coded in the modes of mA, mB, mC and mD, respectively. First, a concept of block-mode frequency is defined using a temporal window across w frames, wherein w may or may not be equal to n, the number of frames chosen in the steps of FIG. 3. The frequency of each image block mode $F_m$ is the number of times the block mode m is used for all the blocks in the previous w frames and for the blocks in the current frame that have been coded. A mode-frequency prediction, $F^0$, can then be made based on the frequencies of the block modes:

$$F_0=\alpha\ \min(F_{mA}, F_{mB}, F_{mC}, F_{mD});\qquad\text{Equation 4}$$

where $\alpha$ is a positive parameter less than 1. The multiplication factor $\alpha$ can be changed or adjusted during the video coding process to control the motion search and the video quality, i.e., $\alpha$ can be changed dynamically during the coding process The block mode selection can then be conducted using the mode-frequency prediction. Each mode m among all the M possible modes will be considered if Equation 5 is true:

$$F_m \geq F^0.\qquad\text{Equation 5:}$$

If Equation 6 is true, then mode m will be skipped during the motion search:

$$F_m < F^0.\qquad\text{Equation 6:}$$

The mode-frequency prediction $F^0$ can be very flexible. The prediction can be made from various sets of the neighboring image blocks. For example, the following equations will give very similar results:

$$F^0=\alpha \cdot \min(F_{mA}, F_{mB}, F_{mC});\text{or}\qquad\text{Equation 7:}$$

$$F^0=\alpha \cdot \min(F_{mA}, F_{mB}).\qquad\text{Equation 8:}$$

In a special case, when all the neighboring blocks 28, 30, 32 and 34, i.e., blocks A, B, C and D, respectively, are out of the image frame or coded as intra blocks, the mode-frequency prediction is set to zero, which means that all of the M block modes will be considered during each search. In another special case, all the M possible modes are considered when the first $w_1$ frames of a sequence are coded while the system accumulates statistics for the modes. The parameter $w_1$ typically is a positive integer not larger than w, the total number of frames.

FIG. 4 is a flowchart of the method of block mode prediction. In particular, step 51 comprises choosing M, the number of possible image block modes. Step 52 comprises choosing the possible image blocks adjacent to the block to be searched, such as choosing blocks A and B, choosing blocks A, B and C, choosing blocks A, B, C and D, choosing blocks A, B, C, D and F, etc. Step 54 comprises determining mA, mB, mC, mD, etc, which are the block modes of each of the chosen adjacent blocks. Step 56 comprises choosing w, the total number of frames. Step 58 comprises choosing $w_1$, the subset of frames of w for the special search case set forth above. Step 60 comprises determining $F_{mA}$, $F_{mB}$, $F_{mC}$, $F_{mD}$, etc, which are the frequencies of each image block, i.e., the number of times block mode m is used for all the blocks in the previous w frames and for the blocks in the current frame that have been coded. Step 62 comprises choosing α, a positive integer less than one. Step 64 comprises determining $F^0$ by Equations 4, 7, 8 or other similar equation for the chosen number of blocks adjacent to the block to be searched (determined in step 52). Step 66 comprises determining whether $F_m$ is greater than or equal to $F^0$. If so, in step 68 each mode m among the M possible modes is searched. If not, in step 70 mode m is skipped during the motion search. Those skilled in the art will understand that the individual steps shown in FIG. 4 may be conducted a variety of different sequences, i.e., the initially chosen variables may be chosen in any order. Moreover, the method of conducting a combined frame prediction search and block mode prediction search simply entails combining in one search the steps set forth in both of FIGS. 3 and 4.

Figure 5:
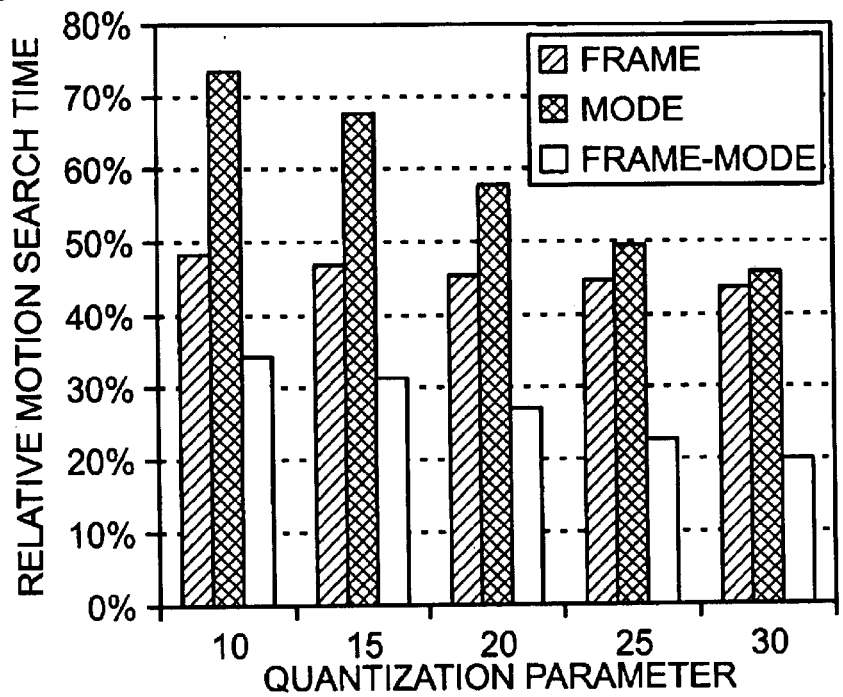
FIG. 5 is a graph of experimental results of a relative motion search for the QCIF format.

FIG. 5 is a graph of the experimental results of a relative motion search for the quarter common intermediate format (QCIF) format. In this particular experiment the following parameters were used: the image block size was 16×16; n=5; $p_0$=1, m=7 (which corresponds to block tiling patterns of 4×4, 4×8, 8×4, 8×8, 8×16, 16×8, and 16×16); α=½; w=4; and $w_1$=1. The experimental results shown are for a QCIF format sequence at 10 frames per second using frame prediction, mode prediction, and a combination of frame and mode prediction, respectively. The speed up ratio using the combined frame and mode prediction search is in the range of three to five times faster than the traditional full search of all frames and modes, i.e., 35% to 20% of the time required for the full search, depending on the quantization parameter utilized, as represented by the horizontal axis in FIG. 5.

The quantization parameter (QP) is a parameter used in image and video coding to control the coding quality. Usually, a high QP provides low-quality images and a low QP delivers high-quality images, as understood by those skilled in the art. Therefore, video coding is sensitive to the accuracy of motion estimation when the QP is relatively low. This explains why the disclosed method has different performance with respect to the different QP values. Accordingly, the H.26L standard is used as only one example to demonstrate the performance of the disclosed invention.

Figure 6:
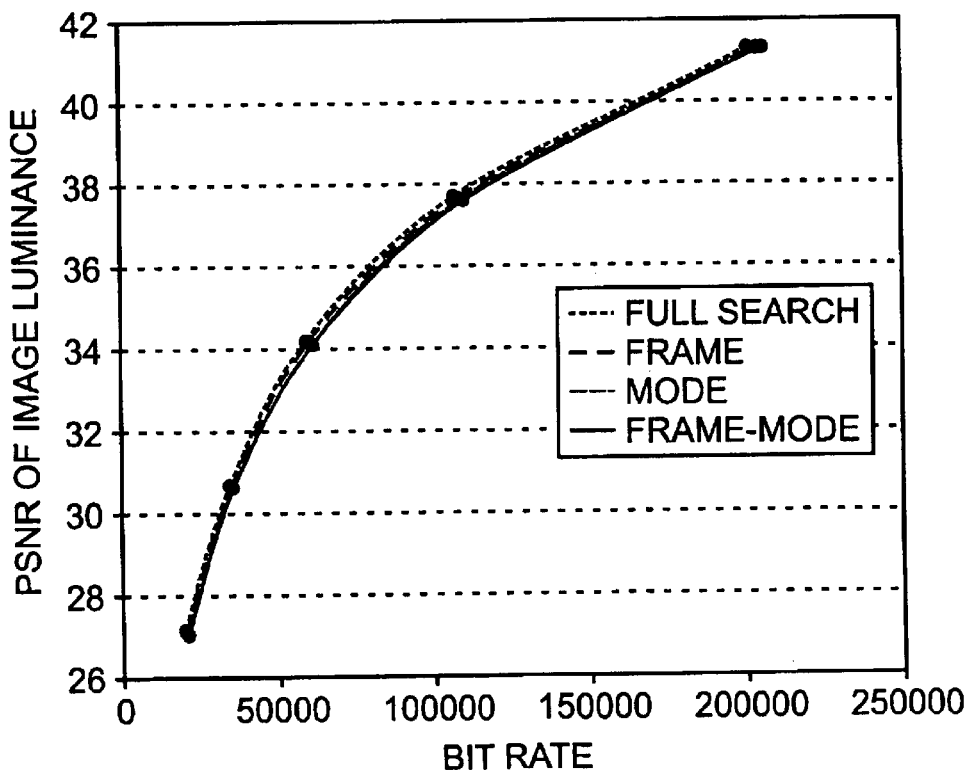
FIG. 6 is a graph of the rate-distortion performance of the coding system for the QCIF sequence of FIG. 5.

FIG. 6 is a graph of the rate-distortion performance of the coding system for the QCIF sequence shown in FIG. 5. The horizontal axis represents the bit rate, and the vertical axis represents the distortion, i.e., the peak signal to noise ratio (PSNR) of the image luminance. Comparing the frame prediction search, the mode prediction search, and the combined frame and mode prediction search to the conventional full search of all frames and all modes, shows that there is little degradation in performance when utilizing the method of the present invention. In particular, the distortion introduced by the method of the present invention, which utilizes a subset of the reference frames and a subset of the image block modes, is less than 0.5 dB in terms of the peak signal to noise ratio for a variety of bit rates.

Figure 7:
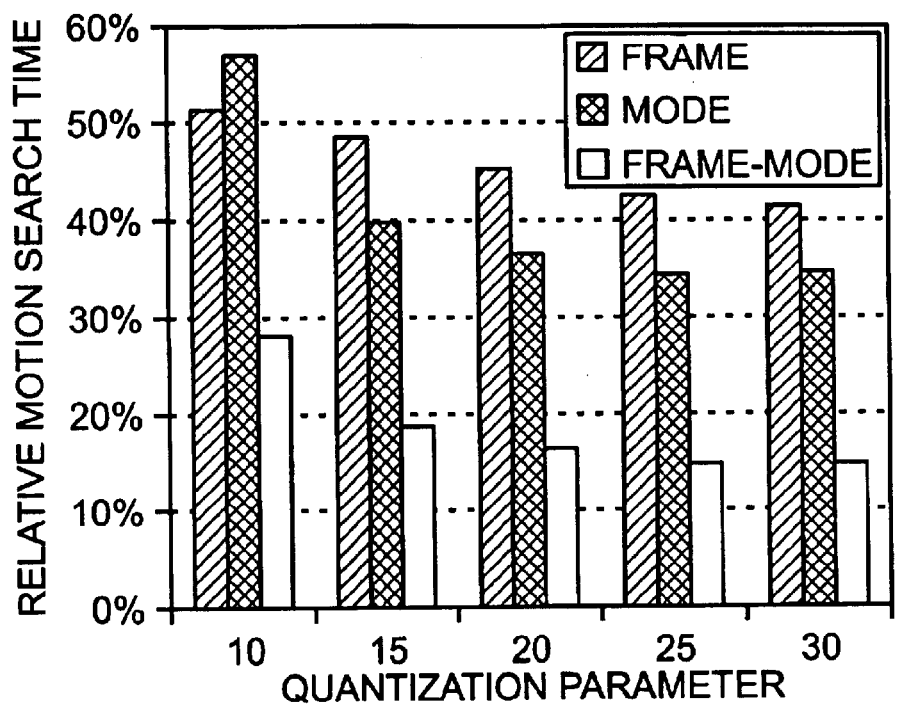
FIG. 7 is a graph of experimental results of a relative motion search for the CIF format.

FIG. 7 is a graph of experimental results of a relative motion search for a common intermediate format (CIF) format at 30 frames per second using frame prediction, mode prediction and a combination of frame and mode prediction, respectively. The speed up ratio using the combined frame and mode prediction search is in the range of four to six times faster than the traditional full search of all frames and all modes, i.e., 28% to 15% of the time required for the full search, depending on the quantization parameter utilized, as represented by the horizontal axis in FIG. 7.

Figure 8:
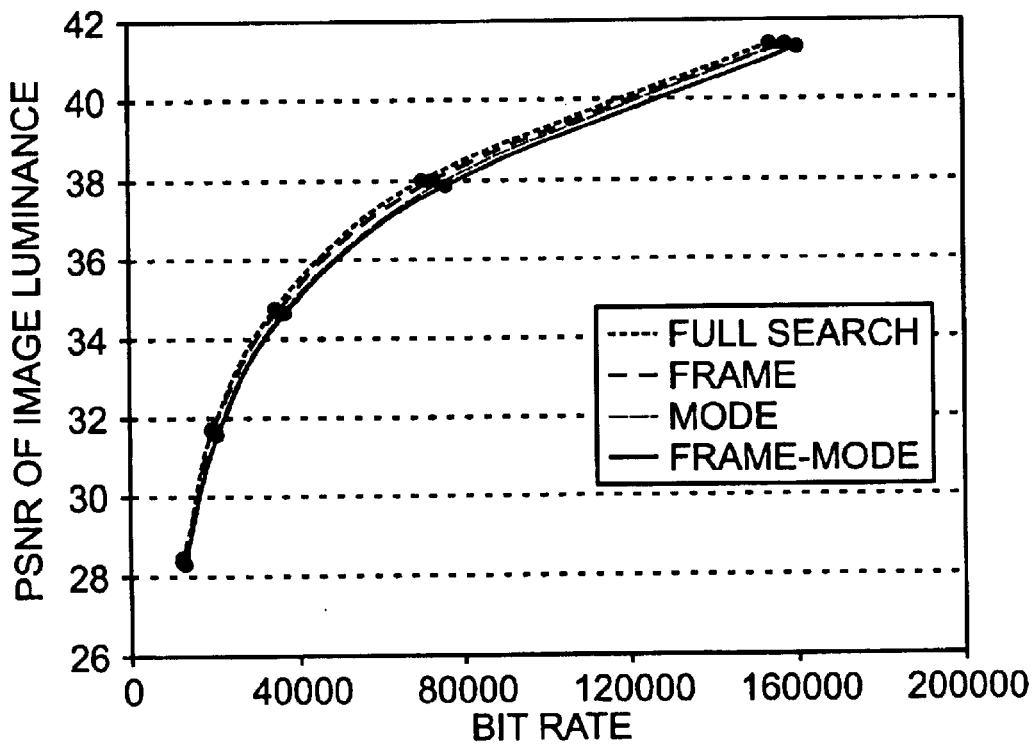
FIG. 8 is a graph of the rate-distortion performance of the coding system for the CIF sequence of FIG. 7.

FIG. 8 is a graph of the rate-distortion performance of the coding system for the CIF sequence shown in FIG. 7. The horizontal axis represents the bit rate, and the vertical axis represents the PSNR of image luminance. Comparing the frame prediction search, the mode prediction search, and the combined frame and mode prediction search to the conventional full search of all frames and all modes, shows that there is little degradation in performance when utilizing the method of the present invention.

In the example shown, the mode corresponds to one of the block sizes 16×16, 16×8, 8×16, 8×8, 8×4, 4×8 and 4×4. However, the present method can be used for other block sizes or coding modes. For example, different coding modes may be used in intra coding where different directions of spatial prediction are used in each mode. Moreover, the motion search method within each particular reference frame and for one specific block mode is not specified for this invention because any of a variety of fast search methods may be used within these stages, as will be understood by those skilled in the art.

As an example, motion searches using multiple reference frames and modes have been addressed by using a series of independent searches, one per frame and mode combination. As previously described, the methods of reference frame prediction and mode prediction reduce the complexity of the motion search by selectively reducing the number of ordinary motion searches conducted. This benefit applies regardless of the motion search technique used for the individual motion searches. One particular existing method for fast motion searches of a single reference frame and coding mode operates by giving a preferred order to the set of motion vectors tested, i.e., a spiral search. The success of these fast searches relies upon finding near optimal solutions among the first few vectors tested. This allows sub-optimal vectors to be eliminated quickly from later parts of the search, giving a computation gain. The ideas of reference frame prediction and mode prediction can enhance this operation. Even if all reference frames and coding modes are examined, the reference frame prediction and mode prediction methods of the present invention can serve to order the reference frames and the coding modes so that a fast search has a greater probability of encountering near optimal vectors in the first few reference frames and coding modes of the search. In other words, the subset of frames and the subset of modes predicted by the calculations set forth herein can be searched first, and the remaining frames and modes not included in the subset determined by the inventive search methods, can be searched second. This ordering of the subsets to be searched first enhances the performance of such as fast motion search algorithms even if all the reference frames and coding modes are examined. Thus, the present invention provides a method of ordering the reference frames and the modes searched by existing fast motion searches so as to enhance the fast motion search.

Thus, a method of conducting a reference frame prediction search, a method of conducting a block mode prediction search, and a method of conducting a combined frame prediction and block mode prediction search, for fast motion searches in advanced video coding, have been disclosed. Although preferred methods of conducting the searches have been disclosed, it should be appreciated that further variations and modifications may be made thereto without departing from the scope of the invention as defined in the appended claims.

We claim:

1. In a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of:

selecting an image block in the current frame;
selecting a number of reference frames;
selecting a number of blocks adjacent to said image block in the current frame;
selecting a value for an addition factor;
for each of said selected blocks adjacent to said image block in the current frame, determining a reference image block in one of said number of reference frames;
calculating a subset of frames of said number of reference frames in which to search for said optimal reference block, wherein said subset of frames comprises multiple frames positioned rearwardly in time from said current frame, wherein the calculation comprises choosing the minimum of either the number of reference frames minus one, or the addition factor plus the maximum of the number of frames counted rearwardly in time from said current frame to reach the frame containing the reference image block in said one of said number of reference frames for each of said reference image blocks; and
searching the subset of frames for said optimal reference block.

2. The method of claim 1 wherein the number of blocks adjacent to said image block in the current frame is selected to be less than nine.

3. The method of claim 1 wherein the number of blocks adjacent to said image block in the current frame is selected to be less than five.

4. The method of claim 1 wherein the addition factor is a positive integer.

5. The method of claim 1 further comprising the steps of:
selecting a number of image block modes;
determining the mode of each of said selected number of blocks adjacent to said image block in the current frame;
determining the frequency of each image block mode;
selecting a multiplication factor;
calculating a mode-frequency prediction factor by multiplying the multiplication factor by the minimum one of the frequency of each image block mode;
calculating a subset of modes of said number of image block modes in which to search for said optimal reference block, wherein said subset of modes comprises each of the modes of said number of image block modes when the frequency of each of said modes of said number of image block modes is greater than or equal to said mode-frequency prediction factor, and wherein said subset of modes excludes a particular mode of said number of image block modes when the frequency of the particular mode is less than said mode-frequency prediction factor; and
searching the subset of modes for said optimal reference block.

6. The method of claim 5 wherein the number of image block modes selected is seven.

7. The method of claim 5 wherein said method is conducted at least three times faster than a search including each frame of said number of reference frames and each mode of said number of image block modes.

8. The method of claim 1 wherein said method is conducted using a format sequence chosen from the group consisting of a CIF format sequence and a QCIF format sequence.

9. The method of claim 1 wherein said method is conducted at a frame speed greater than one frame per second and less than sixty frames per second.

10. The method of claim 1 wherein said method is conducted at a bit rate of greater than 10,000 and less than 250,000.

11. The method of claim 1 wherein a distortion introduced to the video sequence is less than 0.5 dB with respect to a peak signal to noise ratio.

12. The method of claim 1 wherein said method is conducted in less than fifty two percent of the time required to conduct a search including each frame of said number of reference frames.

13. The method of claim 1 wherein the addition factor is adjusted dynamically.

14. The method of claim 1 wherein said subset of frames is searched for said optimal reference block and thereafter a remainder of said number of reference frames are searched for said optimal reference block, such that said subset of frames is given a preferential order during said search.

15. In a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of:

selecting an image block in the current frame;
selecting a number of reference frames;
selecting a number of blocks adjacent to said image block in the current frame;

selecting a number of image block modes;

determining the mode of each of said selected number of blocks adjacent to said image block in the current frame;

determining the frequency of each image block mode within said number of reference frames;

selecting a multiplication factor;

calculating a mode-frequency prediction factor by multiplying the multiplication factor by the minimum one of the frequency of each image block mode;

calculating a subset of modes of said number of image block modes in which to search for said optimal reference block, wherein said subset of modes comprises each of the modes of said number of image block modes when the frequency of each of said modes of said number of image block modes is greater than or equal to said mode-frequency prediction factor, and wherein said subset of modes excludes a particular mode of said number of image block modes when the frequency of the particular mode is less than said mode-frequency prediction factor; and searching the subset of modes of said number of image block modes for said optimal reference block.

16. The method of claim 15 wherein said method is conducted in less than seventy five percent of the time required to conduct a search including each mode of said number of image block modes.

17. The method of claim 15 further comprising the steps of:

selecting a value for an addition factor;

for each of said selected blocks adjacent to said image block in the current frame, determining a reference image block in one of said number of reference frames;

calculating a subset of frames of said number of reference frames in which to search for said optimal reference block, wherein said subset of frames comprises multiple frames positioned rearwardly in time from said current frame, wherein the calculation comprises choosing the minimum of either the number of reference frames minus one, or the addition factor plus the maximum of the number of frames counted rearwardly in time from said current frame to reach the frame containing the reference image block in said one of said number of reference frames for each of said reference image blocks; and searching the subset of frames for said optimal reference block.

18. The method of claim 7 wherein the addition factor is one.

19. The method of claim 15 wherein the multiplication factor is one half.

20. The method of claim 15 wherein the multiplication factor is adjusted dynamically.

21. The method of claim 15 wherein said subset of modes of said number of image block modes is searched for said optimal reference block and thereafter a remainder of said number of image block modes is searched for said optimal reference block, such that said subset of modes is given a preferential order during said search.

22. In a digital video system where a video sequence is represented by a series of frames, including a current frame and multiple previous reference frames positioned rearwardly in time with respect to said current frame, each separated by a predetermined time interval, the frames being divided into a plurality of blocks with predetermined positions, with each block including a predetermined matrix of pixel data, a method of efficiently estimating a change in position of an image represented by a matrix of pixel data in an image block in the current frame from corresponding matrices of pixel data in a previous frame of said series of reference frames, by determining the location of an optimal reference block within said series of reference frames, wherein said optimal reference block corresponds to said image block, the method comprising the steps of:

selecting an image block in the current frame;

selecting a number of reference frames;

selecting a number of blocks adjacent to said image block in the current frame;

selecting a value for an addition factor;

for each of said selected blocks adjacent to said image block in the current frame, determining a reference image block in one of said number of reference frames;

calculating a subset of frames of said number of reference frames in which to search for said optimal reference block, wherein said subset of frames comprises multiple frames positioned rearwardly in time from said current frame, wherein the calculation comprises choosing the minimum of either the number of reference frames minus one, or the addition factor plus the maximum of the number of frames counted rearwardly in time from said current frame to reach the frame containing the reference image block in said one of said number of reference frames for each of said reference image blocks;

selecting a number of image block modes;

determining the mode of each of said selected number of blocks adjacent to said image block in the current frame;

determining the frequency of each image block mode;

selecting a multiplication factor;

calculating a mode-frequency prediction factor by multiplying the multiplication factor by the minimum one of the frequency of each image block mode;

calculating a subset of modes of said number of image block modes in which to search for said optimal reference block, wherein said subset of modes comprises each of the modes of said number of image block modes when the frequency of each of said modes of said number of image block modes is greater than or equal to said mode-frequency prediction factor, and wherein said subset of modes excludes a particular mode of said number of image block modes when the frequency of the particular mode is less than said mode-frequency prediction factor; and searching the subset of frames of said number of reference frames and searching the subset of modes of said number of image block modes for said optimal reference block.

* * * * *

UNITED STATES PATENT AND TRADEMARK OFFICE
CERTIFICATE OF CORRECTION

PATENT NO.   : 6,782,052 B2
DATED        : August 24, 2004
INVENTOR(S)  : Shijun Sun et al.

It is certified that error appears in the above-identified patent and that said Letters Patent is hereby corrected as shown below:

Column 6,
Line 37, Equation 4, "$F_O=\alpha\ \min(F_{mA'}\ F_{mB'}\ F_{mC'}\ F_{mD'})$;" should read -- $F^O=\alpha\ \min(F_{mA'}\ F_{mB'}\ F_{mC'}\ F_{mD'})$ --;

Signed and Sealed this

Twenty-sixth Day of July, 2005

JON W. DUDAS
*Director of the United States Patent and Trademark Office*